(12) United States Patent
Tanimura

(10) Patent No.: US 7,941,691 B2
(45) Date of Patent: May 10, 2011

(54) CONTROL OF CONNECTING APPARATUSES IN INFORMATION PROCESSING SYSTEM

(75) Inventor: Yoichi Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 12/382,185

(22) Filed: Mar. 10, 2009

(65) Prior Publication Data

US 2009/0299492 A1 Dec. 3, 2009

(30) Foreign Application Priority Data

May 28, 2008 (JP) ................................. 2008-140118

(51) Int. Cl.
*G06F 11/00* (2006.01)
(52) U.S. Cl. ............................................. 714/4; 714/5
(58) Field of Classification Search .................... None
See application file for complete search history.

(56) References Cited

U.S. PATENT DOCUMENTS

| | | | | |
|---|---|---|---|---|
| 6,145,066 A * | 11/2000 | Atkin | ............................. | 711/165 |
| 6,463,573 B1 * | 10/2002 | Maddalozzo et al. | ........ | 716/125 |
| 6,832,330 B1 * | 12/2004 | Boudrie et al. | ................... | 714/6 |
| 2002/0194529 A1 * | 12/2002 | Doucette et al. | ................. | 714/6 |
| 2004/0073831 A1 * | 4/2004 | Yanai et al. | ........................ | 714/7 |
| 2004/0078637 A1 * | 4/2004 | Fellin et al. | ......................... | 714/6 |
| 2005/0278565 A1 * | 12/2005 | Frattura et al. | .................... | 714/5 |
| 2006/0048014 A1 * | 3/2006 | Takahashi et al. | .............. | 714/44 |

FOREIGN PATENT DOCUMENTS

JP 62-103756 5/1987

* cited by examiner

*Primary Examiner* — Gabriel L Chu
(74) *Attorney, Agent, or Firm* — Staas & Halsey LLP

(57) ABSTRACT

In an information processing system, a first system control apparatus of a first information processing apparatus causes a first connecting apparatus to disconnect from the first shared storage apparatus, causes a second connecting apparatus to disconnect from the second shared storage apparatus, causes a control part to start up the first information processing apparatus, causes another first connecting apparatus used to replace the first connecting apparatus to connect to the first shared storage apparatus, and causes the second connecting apparatus to connect to the second shared storage apparatus. In the information processing system, a second information processing apparatus includes a second system control apparatus and a third and fourth connecting apparatuses used to connect to the first and second shared storage apparatuses, respectively.

12 Claims, 5 Drawing Sheets

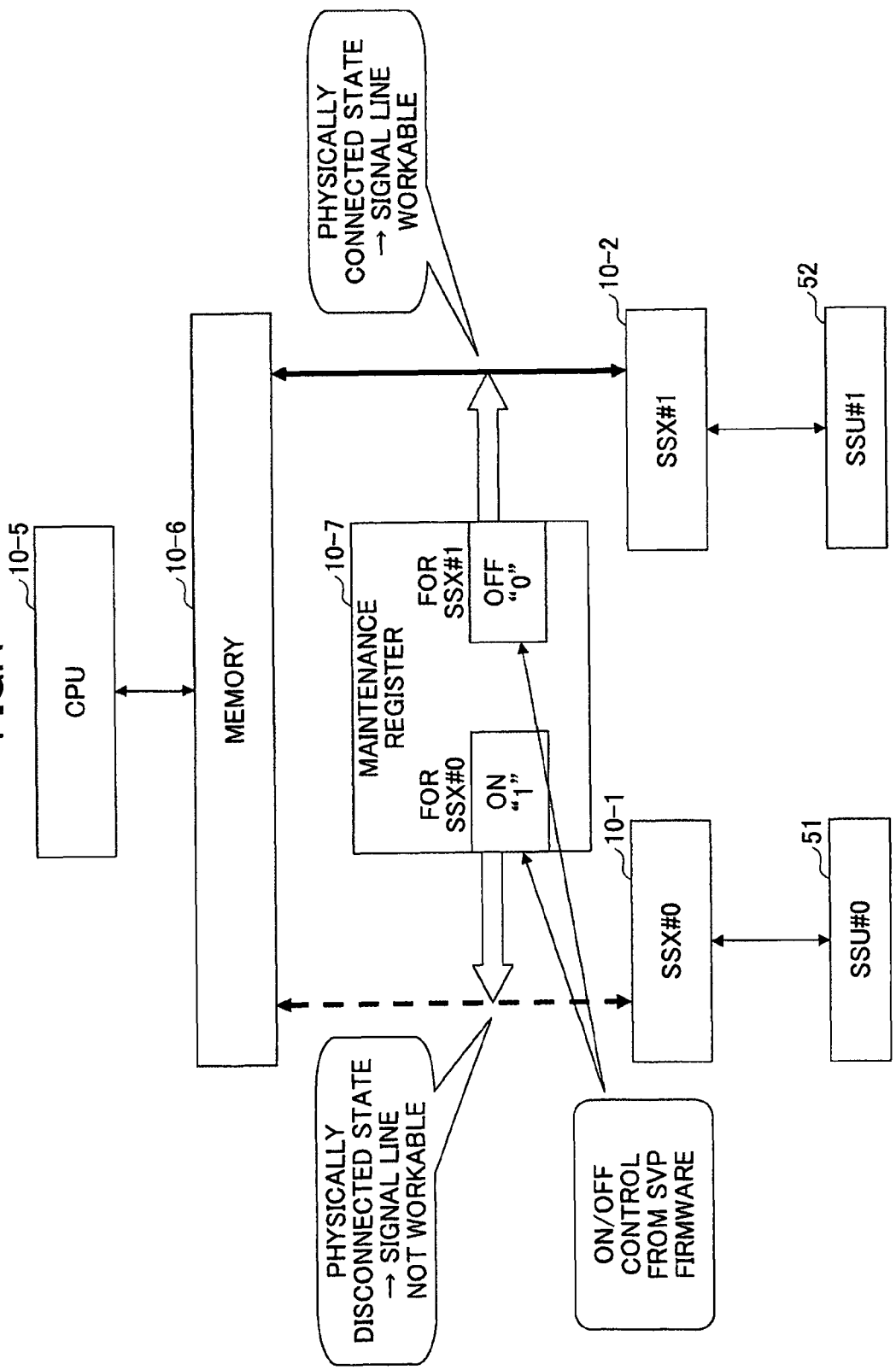

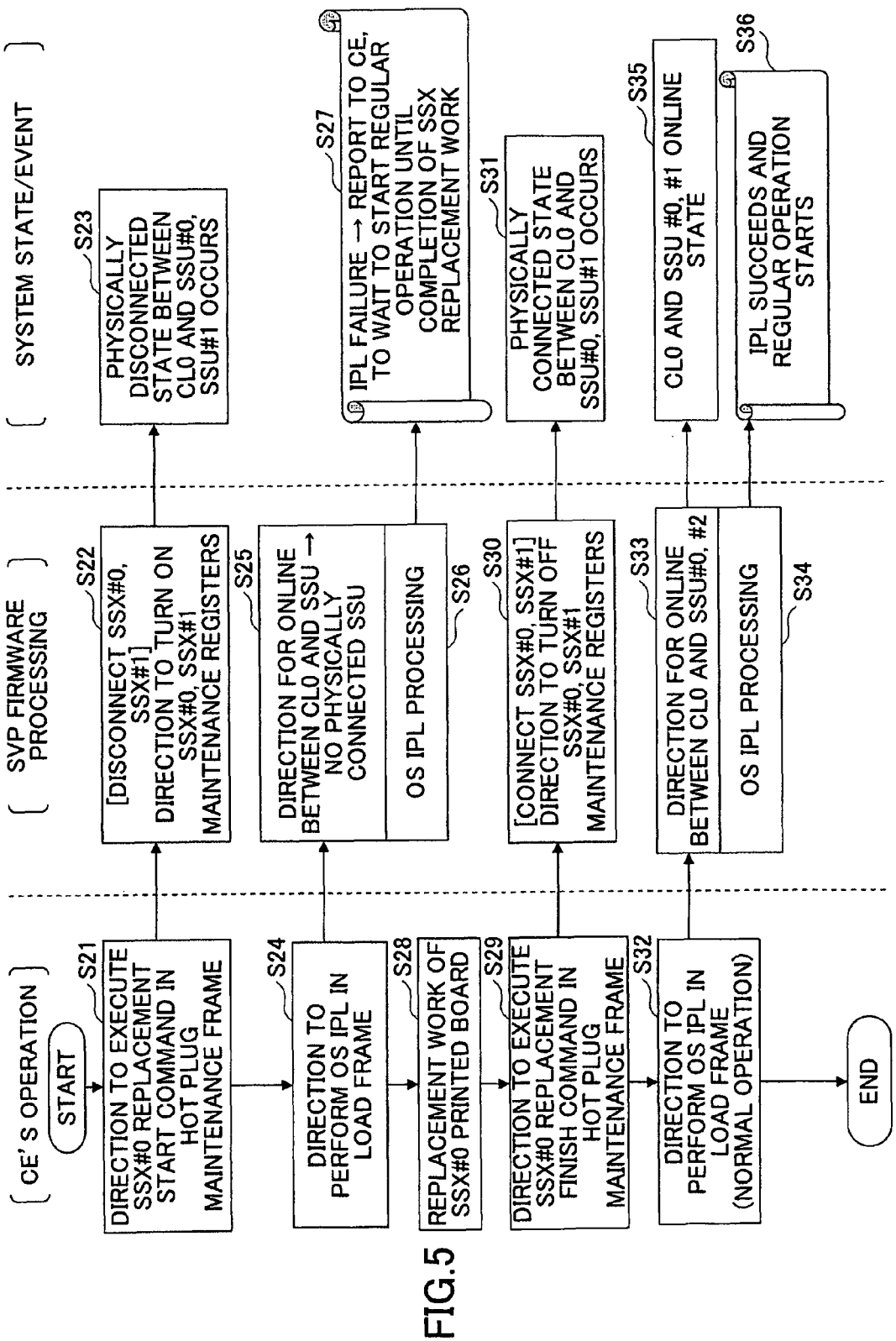

CONTROL OF CONNECTING APPARATUSES IN INFORMATION PROCESSING SYSTEM

CROSS-REFERENCE TO RELATED APPLICATIONS

This application is based upon and claims the benefit of priority of the prior Japanese Patent Application No. 2008-140118, filed on May 28, 2008, the entire contents of which are incorporated herein by reference.

FIELD

The embodiments discussed herein are directed to a control method for controlling a connecting apparatus in an information processing system, a computer-readable information recording medium and an information processing apparatus.

BACKGROUND

As an information processing system, the following system is known. That is, a microprocessor of a sharing memory controller included in a sharing memory device communicates, through a sharing memory bus and sharing memory ports of the sharing memory device and sharing memory interfaces of computers, with the same computers. Double control of the sharing memory device is executed by a double control circuit of the sharing memory interface selected out of the sharing memory interfaces of the computers.

Japanese Laid-Open Patent Publication No. 62-103756 discusses the prior art.

SUMMARY

In the embodiment, a first connecting apparatus is caused to disconnect a first information processing apparatus from a first shared storage apparatus, and a second connecting apparatus is caused to disconnect the first information processing apparatus from a second shared storage apparatus. An information processing apparatus control part which controls the first information processing apparatus is caused to start up the first information processing apparatus. Another first connecting apparatus which is different from the first connecting apparatus and has replaced the first connecting apparatus is caused to connect the first information processing apparatus with the first shared storage apparatus, and the second connecting apparatus is caused to connect the first information processing apparatus with the second shared storage apparatus.

It is to be understood that both the foregoing general description and the following detailed description are exemplary and explanatory only and are not restrictive of the invention, as claimed.

BRIEF DESCRIPTION OF DRAWINGS

FIG. 4 depicts a block diagram illustrating a physically connected state and a physically disconnected state; and FIG. 5 depicts a sequence diagram illustrating a flow of operation in the information processing system in the embodiment.

DESCRIPTION OF REFERENCE NUMERALS

10, 20 cluster (information processing apparatus)

10-1, 10-2, 20-1, 20-2 SSX (first and second connecting apparatuses or another first connecting apparatus)

10-7 maintenance register

10-10 OS (information processing apparatus control part)

11 display apparatus

12, 22 SVP (system control apparatus)

12-5 firmware (control program)

51, 52 SSU (shared storage apparatus)

Description of Embodiments

First, before actually describing the embodiments, a reference example will be described. In the reference example, a large-scale computer system (referred to as a multi-cluster system, hereinafter) includes a plurality of information processing apparatuses called clusters and multiplexed memories (i.e., System Storage Units, abbreviated as SSUs, hereinafter) shared by the clusters. In the system, each cluster is provided with a connecting apparatus (i.e., a System Storage eXtender, abbreviated as a SSX, hereinafter) for connecting with a SSU.

Figure 1:
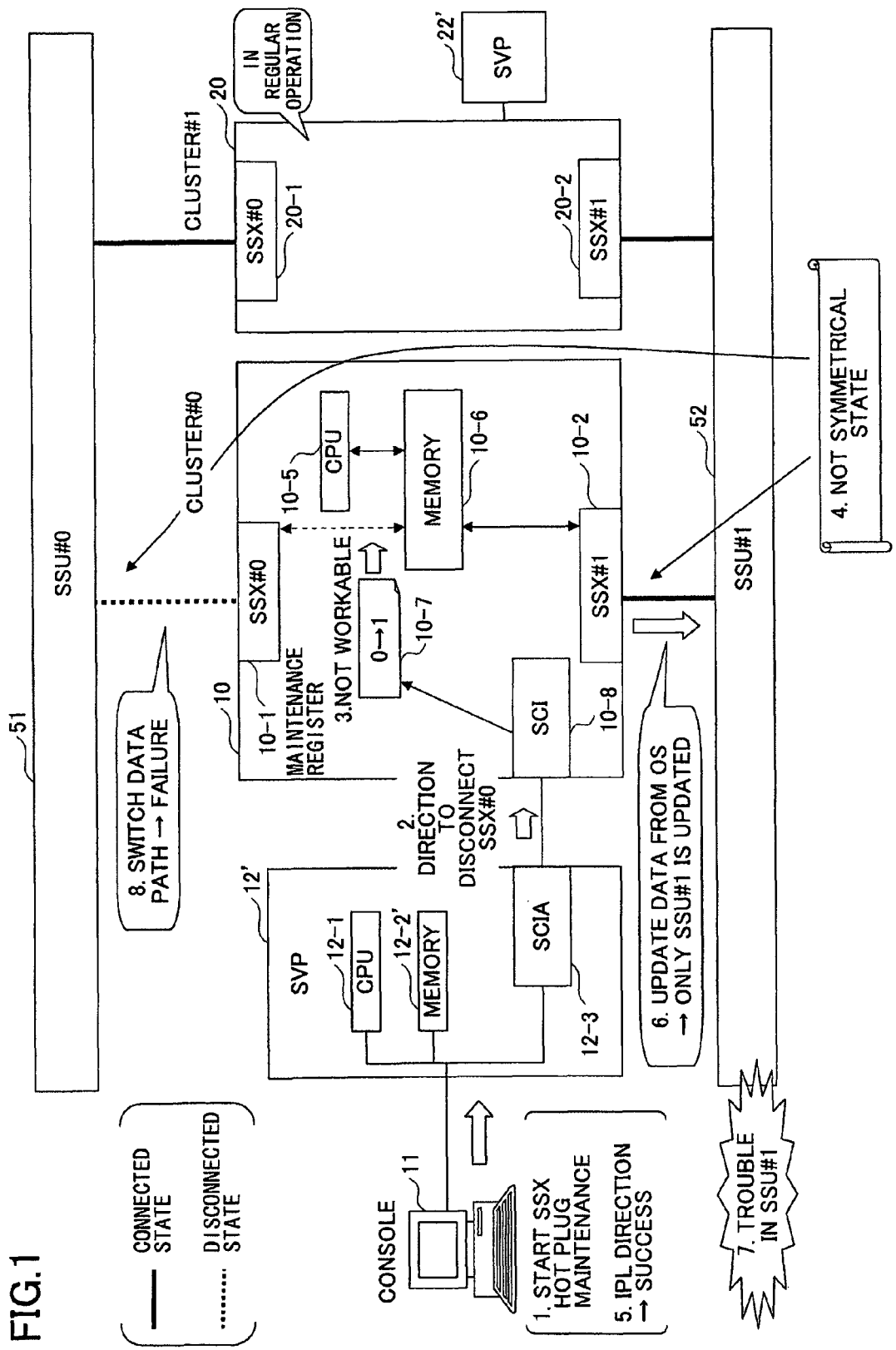
FIGS. 1 and 2 illustrate a problem in a reference example.

FIG. 1 depicts a configuration of one example of such a multi-cluster system. As depicted in FIG. 1, the multi-cluster system includes two clusters 10, 20, and two SSUs 51, 52 each of which is shared by the clusters 10, 20. To each cluster 10 or 20, a system controlling apparatus (i.e., SerVice Processor, abbreviated as SVP, hereinafter) 12' or 22' is connected. To each SVP 12' or 22', a computer (referred to as a consol, hereinafter) 11, used as an operating terminal for an operator (i.e., a Customer Engineer, abbreviated as a CE, hereinafter), is connected. Each cluster 10 or 20 is provided with SSXs 10-1, 10-2 or 20-1, 20-2 used to connect with the SSUs 51 and 52, respectively.

Figure 2:
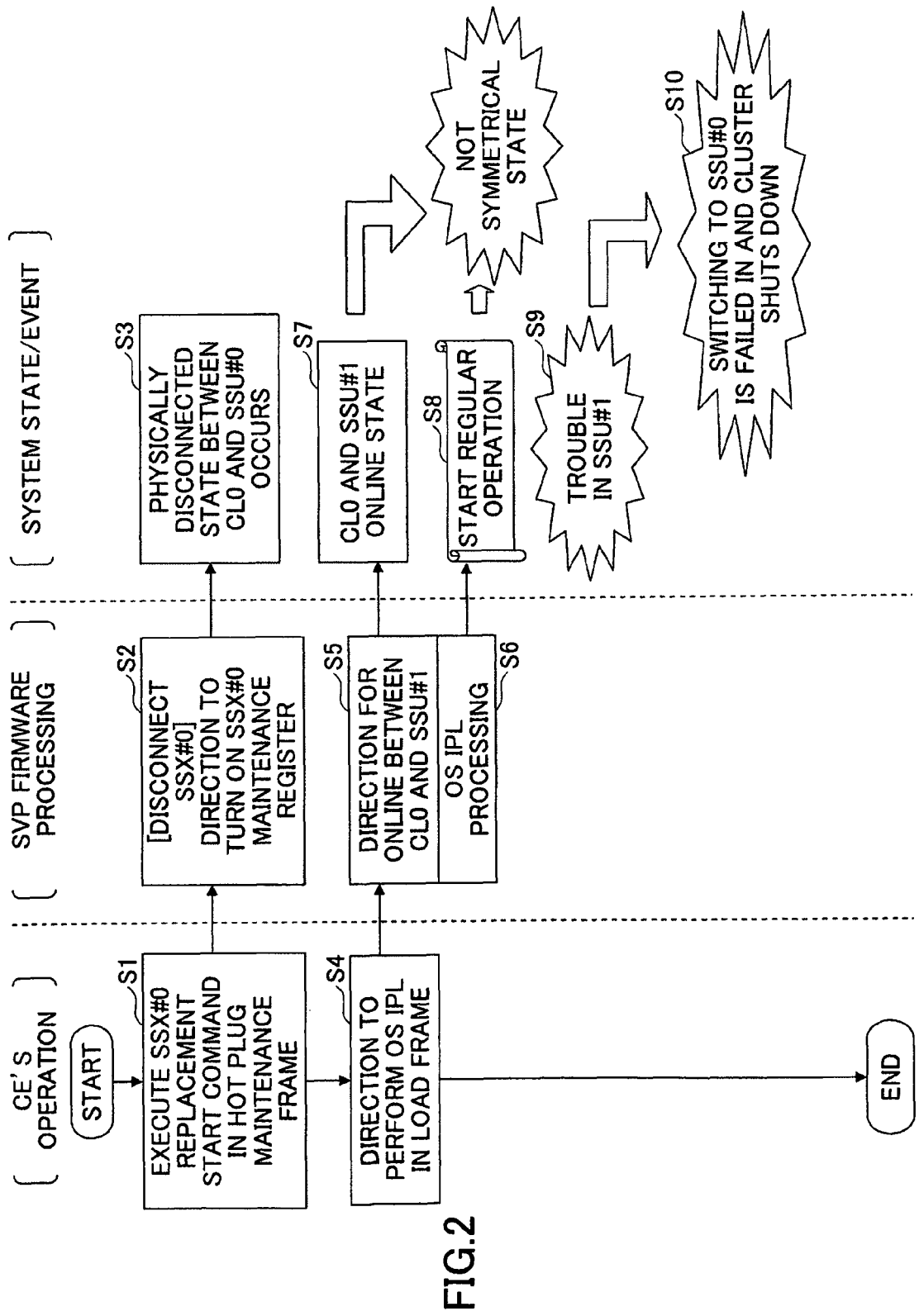

In the multi-cluster system in the reference example, a case is now assumed in which the SSX 10-1 is replaced in a hot plug condition for a certain reason. "The SSX 10-1 is replaced in a hot plug condition" means that, the SSX 10-1 is replaced in such a condition that the SSU 51 with which the SSX 10-1 is connected is stopped, while operation of the multi-cluster system is continued. FIG. 2 illustrates the case where the SSX 10-1 is thus replaced in a hot plug condition.

As depicted in FIG. 2, first, a CE gives a direction to the console 11 to replace the SSX 10-1 (Step S1). The SVP 12' responds thereto, to cause the SSX 10-1 of the cluster 10 to disconnect the corresponding SSU 51 (Steps S2, S3). Then, when the CE operates the consol 11 to start up the cluster 10 in this condition (Step S4), an online state is created only with the SSU 52 which is connected while the SSU 51 has been thus disconnected as mentioned above, in the cluster 10 (Steps S5 through S8).

Then, when stored information of the SSU is updated in this condition, stored information in the SSU 52 which is connected is actually updated. However, stored information in the SSU 51 which has been disconnected is not actually updated. As a result, symmetry of stored information between the SSUs 51 and 52, which are the multiplexed memories, breaks.

Then, when a trouble occurs in the SSU 52 which is in the online condition in the state in which the symmetry of stored information between the SSUs 51 and 52 has broken as mentioned above (Step S9), the cluster 10 attempts to switch to enter such a state that an online condition is created with the other SSU 51. However, as mentioned above, the SSX 10-1 has disconnected the other SSU 51 in Step S3. Therefore, the cluster 10 cannot actually switch to create such a state that online condition is created with the other SSU 51. As a result, the cluster 10 may be shut down because of such an error that the cluster 10 fails in switching to create such a state that an online condition is created with the other SSU 51.

In contrast thereto, according to the embodiments, when a first connecting apparatus is to be replaced, the first connecting apparatus is caused to disconnect a first information processing apparatus from a first shared storage apparatus, and a second connecting apparatus is caused to disconnect the first information processing apparatus from a second shared storage apparatus. As a result, the first information processing apparatus can use none of the first and second shard storage apparatuses, and thus, operation of the first information processing apparatus cannot be properly carried out. As a result, it is possible to positively prevent symmetry in stored information between the first and second shared storage apparatuses from breaking into a not symmetrical condition. Further, it is possible to positively prevent the first information processing apparatus from being operated whereby the first information processing apparatus may be shut down by such an error that the first information processing apparatus fails in switching of the shared storage apparatus during the operation.

The embodiments will now be described in detail with reference to figures.

In an information processing system in the embodiment, when replacing a SSX in a hot plug condition, all SSXs of a cluster having the SSX to be replaced are caused to disconnect respective SSUs. In this case, "to disconnect respective SSUs" means to stop performing physical connections with the respective SSUs. The term "physical connection" will be described later with reference to FIG. 4. A states in which the physical connections with the SSUs are not performed will be referred to as a physically disconnected state.

It is assumed that, in the physically disconnected state from the SSUs, a CE erroneously carries out operation for starting up (i.e., Initial Program Loading, abbreviated as IPL) by means of an OS (i.e., Operating System) of a cluster. Even in this case, since, as mentioned above, all the SSUs have been physically disconnected, starting up operation including initialization of the SSUs is failed in. As a result, it is possible to positively prevent symmetry in storied information from breaking between all the multiplexed SSUs of the cluster. Further, since, as mentioned above, all the SSUs are physically disconnected, regular operation of the cluster cannot actually be performed. Therefore, it is possible to positively prevent the cluster from being shut down because of such an error that, switching of the SSU, which may be required because of a possible trouble in the SSU, is failed in during regular operation of the cluster.

Next, with reference to FIG. 3, the information processing system in the embodiment will be described in further detail.

Figure 3:
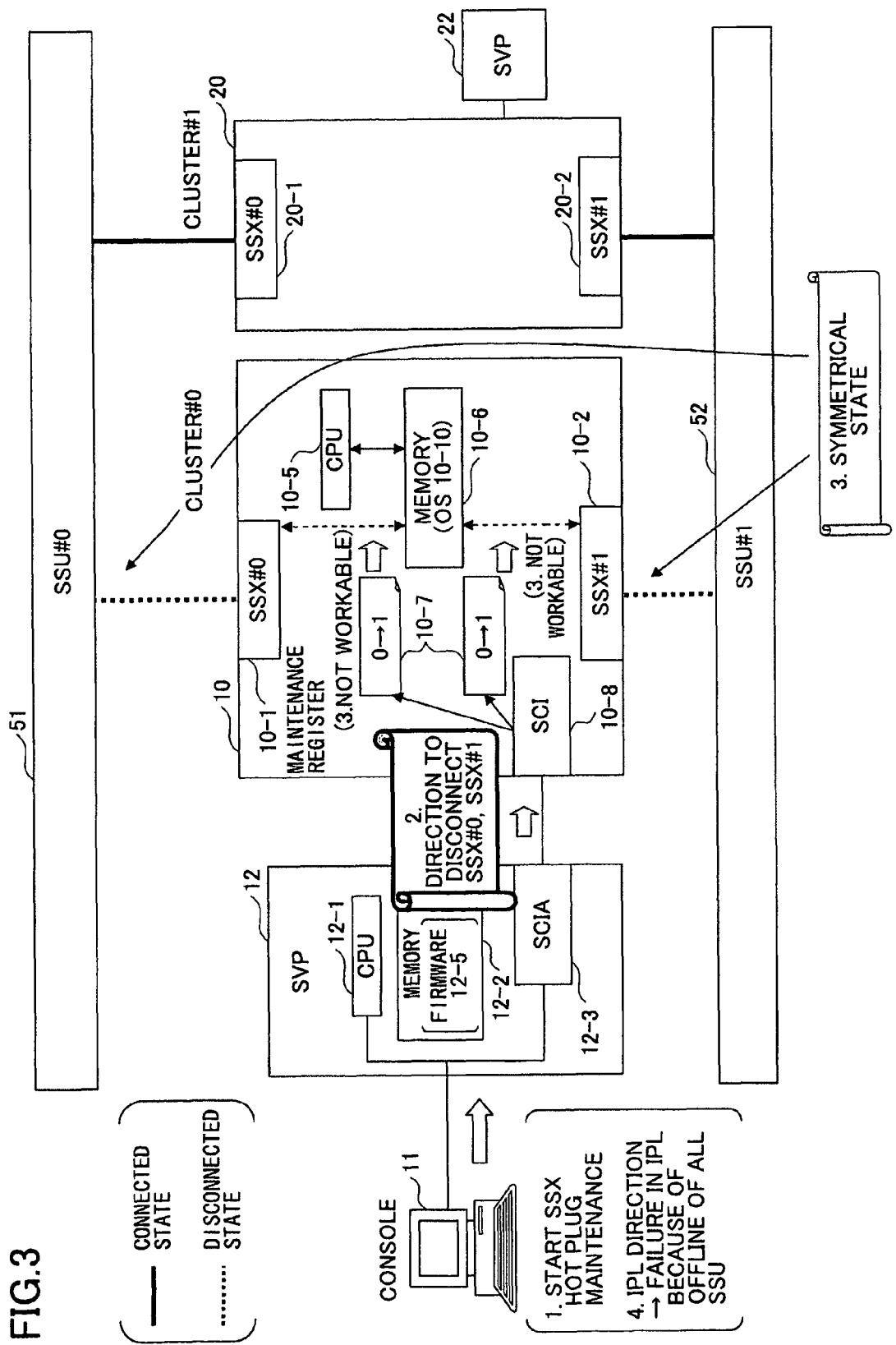
FIG. 3 depicts a block diagram illustrating a configuration of an information processing system in an embodiment.

FIG. 3 depicts a configuration of an information processing system in the embodiment, which is a so-called multi-cluster system. As depicted in FIG. 3, the multi-cluster system includes two clusters 10 and 20. The clusters 10 and 20 share a SSU 51. Also, the clusters 10 and 20 share a SSU 52. In the multi-cluster system, each cluster, for example, the cluster 10 uses the SSU 51 and SSU 52 as multiplexed memories. That is, the cluster 10 carries out updating such as writing information, rewriting information and so forth, in the SSU 51 and SSU 52, in such a manner as to maintain a state in which stored information is the same between the SSU 51 and SSU 52 at any time. Such a state that stored information is the same between the SSU 51 and SSU 52 is referred to as a symmetrical state. On the other hand, such a state that stored information is not the same between the SSU 51 and SSU 52 is referred to as a not symmetrical state. In the multi-cluster system, each cluster 10 or 20 uses the plurality of SSUs 51 and 52 as multiplexed memories. As a result, when any one of the multiplexed SSUs has a trouble and thus stored information of the SSU is destroyed, it is possible to utilize the same stored information of another SSU. Therefore, it is possible to avoid loss of information and thus, it is possible to realize a highly reliable information processing system.

Each cluster 10 or 20 has SSXs 10-1 and 10-2 or 20-1 and 20-2, to connect with SSUs. In the cluster 10, a SSX 10-1 performs physical connection between a memory 10-6 in the cluster 10 and the SSU 51, or stops performing the physical connection. Thus, the SSX 10-1 performs physical connection between the cluster 10 and the SSU 51 or stops performing the physical connection. Similarly, a SSX 10-2 performs physical connection between the memory 10-6 in the cluster 10 and the SSU 52, or stops performing the physical connection. Thus, the SSX 10-2 performs physical connection between the cluster 10 and the SSU 52 or stops performing the physical connection. Also in the cluster 20, a SSX 20-1 performs physical connection between a memory (not depicted) in the cluster 20 and the SSU 51, or stops performing the physical connection. Thus, the SSX 20-1 performs physical connection between the cluster 20 and the SSU 51 or stops performing the physical connection. Similarly, a SSX 20-2 computer-readable physical connection between the memory in the cluster 20 and the SSU 52, or stops performing the physical connection. Thus, the SSX 20-2 computer-readable physical connection between the cluster 20 and the SSU 52 or stops performing the physical connection.

Each cluster, for example, the cluster 10 has a CPU 10-5 and the memory 10-6. In the memory 10-6, an OS 10-10 is stored. Under the control of the OS 10-10, the CPU 10-5 responds to a request from a CE, to control operation of the cluster 10 or to perform various sorts of operations or calculations, using the memory 10-6 appropriately. Further, each cluster, for example, the cluster 10 has registers (referred to as maintenance registers, hereinafter) 10-7 used to set values for physical connections or disconnections of the SSUs 51 and 52 by means of the SSXs 10-1 and 10-2, respectively.

Each cluster, for example, the cluster 10 has a SCI (i.e., System Control Interface) used to receive control information from an SVP 12 described later. The control information is information used for the SVP 12 to externally control operation of the cluster 10. In the control information, information for setting set values in the maintenance registers 10-7 is included.

To each cluster 10 or 20, the SVP 12 or 22 for controlling the cluster 10 or 20 is connected. To each SVP 12 or 22, for example, to the SVP 12, a consol 11 as an operating terminal apparatus (or a display apparatus) for a CE is connected.

Each SVP, for example, the SVP 12 has a CPU 12-1 and a memory 12-2. The CPU 12-1 controls operation of the SVP 12 using the memory 12-2 appropriately. In the memory 12-2, a firmware 12-5 (i.e., a control program) is stored. The CPU 12-1 executes the firmware 12-5 to perform operation of controlling the cluster 10.

Further, each SVP, for example, the SVP 12 has a SCIA (i.e., System Control Interface Adapter) 12-3. The SCIA 12-3 is connected to the SCI 10-8 provided in the cluster 10, and provides an interface for transferring the control information for controlling operation of the cluster 10 to the cluster 10.

Next, with reference to FIG. 4, the above-mentioned terms, the physical connection and disconnection, as well as terms, an online state and an offline state, will be described.

First, physical connection and disconnection will be described. Each cluster, for example, the cluster 10 has the maintenance registers 10-7 as mentioned above. The maintenance register 10-7 is provided for each of the two SSXs 10-1 and 10-2 of the cluster 10. For example, when "1" is set in the maintenance register 10-7 provided for the SSX 10-1, the SSX 10-1 stops performing a physical connection between the memory 10-7 of the cluster 10 and the SSU 51. Specifically, the SSX 10-1 has a bidirectional gate circuit (not depicted), and the maintenance register 10-7 is connected to a control terminal of the bidirectional gate circuit. When the set value in the maintenance register 10-7 is "1", the bidirectional gate circuit is controlled thereby to block signal transmission between input and output terminals of the bidirectional gate circuit. As a result, signal transmission between the memory 10-6 of the cluster 10 and the SSU 51 is not allowed. Such a state is referred to as a state in which a physical connection between the memory 10-6 of the cluster 10 and the SSU 51 (or a physical connection between the cluster 10 and the SSU 51) is not performed. Or, such a state will be referred to as a physically disconnected state between the memory 10-6 of the cluster 10 and the SSU 51 (or a physically disconnected state between the cluster 10 and the SSU 51).

On the other hand, when "0" is set in the maintenance register 10-7 provided for the SSX 10-1, the SSX 10-1 performs a physical connection between the memory 10-7 of the cluster 10 and the SSU 51. That is, the bidirectional gate circuit allows signal transmission between the input and output terminals of the bidirectional gate circuit. As a result, signal transmission between the memory 10-6 of the cluster 10 and the SSU 51 is allowed. Such a state is referred to as a state in which the memory 10-6 of the cluster 10 and the SSU 51 are physically connected (or the cluster 10 and the SSU 51 are physically connected). Or, such a state will be referred to as a physically connected state between the memory 10-6 of the cluster 10 and the SSU 51 (or a physically connected state between the cluster 10 and the SSU 51).

Next, an online state and an offline state are described. In each cluster, for example, in the cluster 10, whether the SSU 51 is in an online state or in an offline state, is expressed by internal information of the OS 10-10 of the cluster 10. More specifically, the OS 10-10 has a register (not depicted, and referred to as an online register, hereinafter) under the control of the OS 10-10, for each SSU. Whether the SSU 51 is in an online state or in an offline state, is expressed by a set value in the online register. For example, when "1" is set in the online register provided for the SSU 51, the OS 10-10 recognizes that the SSU 51 is in an online state. When "0" is set in the online register provided for the SSU 51, the OS 10-10 recognizes that the SSU 51 is in an offline state. It is noted that an online state is also referred to as a logically connected state, and an offline state is also referred to as a logically disconnected state.

Thus, the description has been made with reference to a relationship between the cluster 10 and the SSU 51 for reference. However, also for each of a relationship between the cluster 10 and the SSU 52, a relationship between the cluster 20 and the SSU 51 and a relationship between the cluster 20 and the SSU 52, the same description can be used.

Further, an online state of the SSU 51 or 52 requires a physical connection of the SSU 51 or 52. Therefore, when a physical connection of the SSU 51 or 52 is not performed, an online state of the SSU 51 or 52 cannot be created. Specifically, when the firmware 12-5 of the SVP 12 intends to set a value for an online state in the online register for the SSU 51 or 52, the firmware 12-5 first determines whether a physical connection of the SSU 51 or 52 is performed. This determination can be made by, for example, referring to a set value in the corresponding maintenance register 10-7. Then, when it is determined, as a result, that a physical connection of the SSU 51 or 52 is performed, the firmware 12-5 sets the corresponding online register for an online state. On the other hand, when it is determined that a physical connection of the SSU 51 or 52 is not performed, the firmware 12-5 cannot set the corresponding online register for an online state.

A case will be assumed in which, in this multi-cluster system, the SSX 10-1 is to be replaced in a hot plug condition for some reason. This case will now be described with reference to FIG. 5. In a description below, for the sake of simplification of description, a description will be made as the firmware 12-5 itself performs operation, for a case where actually the CPU 12-1 of the SVP 12 performs the operation by executing the firmware 12-5.

A CE carries out operation on the console 11 to input a command for starting replacement of the SSX 10-1 in a hot plug condition (Step S21). The firmware 12-5 of the SVP 12 receives the command and sets "1" in the maintenance register 10-7 for the SSX 10-1 corresponding to the command to start replacement in a hot plug condition (Step S22). To set "1" in the maintenance register 10-7 is referred to as, to turn on the maintenance register 10-7. Further, the firmware 12-5 sets "1" in the maintenance register 10-7, i.e., turns on the maintenance register 10-7, also for any SSX of the cluster 10 other than the SSX 10-1 corresponding to the command to start replacement in a hot plug condition, i.e., in the embodiment, the SSX 10-2 (Step S22).

As a result of the maintenance registers 10-7 thus being turned on for the SSXs 10-1 and 10-2 of the cluster 10, the respective SSXs 10-1 and 10-2 stop performing physical connections of the SSUs 51 and 52 (Step S23).

Next, a case is assumed in which the CE carries out operation to start up the cluster (i.e., to carry out IPL) (Step S24). In this case, the firmware 12-5 of the SVP 12 first determines whether physical connections of the SSUs 51 and 52 are performed (Step S25), before actually creating online states of the SSUs 51 and 52. As mentioned above, in Step S23, the SSXs 10-1 and 10-2 have stopped performing the physical connections of the SSUs 51 and 52, respectively. Therefore, the firmware 12-5 determines that no physical connections of the SSUs 51 and 52 are performed. As a result, the firmware 12-5 cannot create online states of the SSUs 51 and 52.

Next, the firmware 12-5 performs operation to cause the OS 10-10 of the cluster 10 to start up the cluster 10 (Step S26). Operation of the OS 10-10 to start up the cluster 10 includes operation to initialize the SSUs provided to the cluster 10. Then, when initialization of the SSUs cannot be completed properly, the operation to start up the cluster 10 is failed in. Therefore, for proper completion of starting up the cluster, it is necessary that the SSU 51 or 52 is physically connected with the cluster 10, and also, the SSU 51 or 52 is logically connected (i.e., in an online state) with the cluster 10. As mentioned above, the physical connections of the SSUs 51 and 52 for the cluster 10 have been stopped, and accordingly, no online states can be created therefor. Thus, no SSUs are physically connected and logically connected with the cluster 10. As a result, the OS 10-10 cannot perform initialization of the SSUs, thus cannot properly start up of the cluster 10, and thus, fails in starting up of the cluster 10 (Step S27). In this case, a report of the failing in starting up of the cluster 10, i.e., an error report, is displayed on a screen of the console 11 via the firmware 12-5 of the SVP 12. The CE then sees the display of the error report, and thus, can recognize that starting up of the cluster 10 has been failed in.

Next, in this state, the CE carries out a work to actually replace the SSX 10-1 (Step S28). It is noted that, the SSX 10-1 has, for example, a form of a printed substrate (or a printed board). Therefore, in the work to replace the SSX 10-1, the CE withdraws the SSX 10-1 to be replaced, from a slot of the cluster, and then, inserts another printed substrate as a new SSX 10-1, to the slot.

When the CE finishes the work to replace the SSX 10-1, the CE operates the console 11 to input a command to indicate that replacement of the SSX 10-1 has been finished (Step S29). In response to the command, the firmware 12-5 of the SVP 12 sets "0" in, or turns off, the maintenance registers 10-7 for both SSXs 10-1 and 10-2 (Step S30). In response to the maintenance registers 10-7 being thus turned off, the corresponding SSXs 10-1 and 10-2 physically connect with the corresponding SSUs 51 and 52, respectively (Step S31).

In this state, the CE operates the consol 11 to start up the cluster 10, the same as that in Step S24 mentioned above (Step S32). In response thereto, the same as in Step S25, the firmware 12-5 of the SVP 12 performs operation to create online states of the SSUs 51 and 52. That is, first, the firmware 12-5 determines whether physical connections of the SSUs 51 and 52 are performed (Step S33). As mentioned above, in Step S31, the SSXs 10-1 and 10-2 physically connect with the corresponding SSUs 51 and 52, respectively. Therefor, the firmware 12-5 determines that the SSUs 51 and 52 are physically connected, and thus, creates online states of the SSUs 51 and 52 (Step S35). As a result, the SSUs 51 and 52 enter such a state that the SSUs 51 and 52 are physically connected and logically connected with the cluster 10.

Next, the firmware 12-5 causes the OS 10-10 of the cluster 10 to perform starting up of the cluster 10 (Step S34). As mentioned above, the SSUs 51 and 52 are physically connected and logically connected with the cluster 10. Therefore, the OS 10-10 can perform initializing of the SSUs 51 and 52 properly. As a result, the OS 10-10 can thus complete starting up of the cluster 10. After thus starting up the cluster 10, regular operation of the cluster 10 can be started (Step S36).

Thus, the SVP 12 in the embodiment performs the following operation when receiving an input from a CE to replace one of the SSXs 10-1 and 10-2 (in the example of FIG. 5, the SSU 10-1) which are provided to connect with the SSUs 51 and 52, respectively, for the cluster 10. That is, the firmware 12-5 of the SVP 12 causes all the SSXs 10-1 and 10-2 for connecting with the respective SSUs 51 and 52 for the cluster 10, to stop performing physical connections with or to physically disconnect the SSUs 51 and 52. As a result, as mentioned above, even when starting up of the cluster 10 is attempted in this state, the attempt is positively failed in, and thus, starting up of the cluster 10 is positively prevented. As a result, it is possible to positively avoid a situation that the cluster 10 is started up only with the SSU 10-2, other than the SSU 10-1 to be replaced, being connected. Therefore, it is possible to positively avoid a situation that, the cluster 10 is started up only with the SSU 10-2, and thus, only stored information of the SSU 10-2 is updated so that the above-mentioned not symmetrical state occurs. Further, it is possible to positively avoid a situation that the cluster 10 is regularly operated only with the SSU 10-2 being connected, and the cluster 10 is shut down because switching of the SSU 10-2, which may be required because of a possible trouble in the SSU 10-2, is failed in.

Thus, the multi-cluster system has been described as the information processing system including the two clusters 10, 20 as information processing apparatuses, and two SSUs 51 and 52 as shared storage apparatuses shared by the clusters 10, 20. However, such a specific system should not be limited to. As a variant embodiment, a multi-cluster system as an information processing system may have three or more clusters as information processing apparatuses, and three or more SSUs as shared storage apparatuses shared by the clusters. In the variant embodiment, SSXs are provided to respectively connect with the shared SSUs in each cluster. Then, when one SSU thereamong is replaced in a cluster of the clusters, a firmware of a SVP of the cluster causes all the SSXs, including the SSX to be replaced and also the SSXs other than the SSX to be replaced, to stop performing physical connections with or physically disconnect the respective corresponding SSUs. Then, after the replacement of the SSX, the above-mentioned firmware causes all the SSXs to physically connect with the respective corresponding SSUs. As a result, the corresponding cluster cannot be started up during the replacement work. Thus, it is possible to positively avoid such a situation, that the corresponding cluster is regularly operated only with the SSUs, other than the SSU being replaced, being connected, and a not symmetrical state of stored information between the plurality of multiplexed SSUs occurs. Further, it is possible to positively avoid such a situation that, when a possible trouble occurs in the connected SSUs during regular operation of the corresponding cluster with the SSUs, other than the SSU being replaced, being connected, switching of the SSUs is failed in, whereby the cluster is shut down. Thus, the same advantages as those of the embodiment can be obtained also from the variant embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A control method for an information processing system, said information processing system comprising a first information processing apparatus which comprises a first and second connecting apparatuses and a first system control apparatus, and a second information processing apparatus which comprises a third and fourth connecting apparatuses and a second system control apparatus, a first shared storage apparatus connected with the first and second information processing apparatuses through the first and third connecting apparatuses, and a second shared storage apparatus connected with the first and second information processing apparatuses through the second and fourth connecting apparatuses, said method comprising:

the first system control apparatus causing the first connecting apparatus to disconnect the first information processing apparatus from the first shared storage apparatus;

the first system control apparatus causing the second connecting apparatus to disconnect the first information processing apparatus from the second shared storage apparatus;

the first system control apparatus causing an information processing apparatus control part which controls the first information processing apparatus to start up the first information processing apparatus;

the first system control apparatus causing another first connecting apparatus which is different from the first connecting apparatus and has replaced the first connecting apparatus to connect the first information processing apparatus with the first shared storage apparatus; and the first system control apparatus causing the second connecting apparatus to connect the first information processing apparatus with the second shared storage apparatus.

2. The control method as claimed in claim 1, wherein:
the first system control apparatus further comprises a display apparatus, and, when causing the information processing apparatus control part to start up the first information processing apparatus, outputs an error in the display apparatus if the first information processing apparatus is not started up.

3. The control method as claimed in claim 1, wherein:
the first system control apparatus receives an instruction concerning replacement of the first connecting apparatus, and causes the first connecting apparatus to disconnect the first information processing apparatus from the first shared storage apparatus, and causes the second connecting apparatus to disconnect the first information processing apparatus from the second shared storage apparatus.

4. The control method as claimed in claim 1, wherein:
the first system control apparatus causing the first connecting apparatus to disconnect the first information processing apparatus from the first shared storage apparatus comprises the first system control apparatus causing the first connecting apparatus physically disconnect the first information processing apparatus from the first shared storage apparatus,
the first system control apparatus causing the second connecting apparatus to disconnect the first information processing apparatus from the second shared storage apparatus comprises the first system control apparatus causing the second connecting apparatus to physically disconnect the first information processing apparatus from the second shared storage apparatus,
the first system control apparatus causing the other first connecting apparatus to connect the first information processing apparatus with the first shared storage apparatus comprises the first system control apparatus causing the other first connecting apparatus to physically connect the first information processing apparatus with the first shared storage apparatus,
the first system control apparatus causing the second connecting apparatus to connect the first information processing apparatus with the second shared storage apparatus comprises the first system control apparatus causing the second connecting apparatus to physically connect the first information processing apparatus with the second shared storage apparatus,
and, before the first system control apparatus causes the information processing apparatus control part to start up the first information processing apparatus, the first system control apparatus logically connects the first information processing apparatus with the first shared storage apparatus, and logically connects the first information processing apparatus with the second shared storage apparatus.

5. A computer-readable information recording medium tangibly embodying a control program which, when executed by a computer processor, performs a control method for controlling a first system control apparatus in an information processing system comprising a first information processing apparatus which comprises a first and second connecting apparatuses and the first system control apparatus, and a second information processing apparatus which comprises a third and fourth connecting apparatuses and a second system control apparatus, a first shared storage apparatus connected with the first and second information processing apparatuses through the first and third connecting apparatuses, and a second shared storage apparatus connected with the first and second information processing apparatuses through the second and fourth connecting apparatuses, said control method comprising:
the first system control apparatus causing the first connecting apparatus to disconnect the first information processing apparatus from the first shared storage apparatus;
causing the second connecting apparatus to disconnect the first information processing apparatus from the second shared storage apparatus;
causing an information processing apparatus control part which controls the first information processing apparatus to start up the first information processing apparatus;
causing another first connecting apparatus which is different from the first connecting apparatus and has replaced the first connecting apparatus to connect the first information processing apparatus with the first shared storage apparatus; and
causing the second connecting apparatus to connect the first information processing apparatus with the second shared storage apparatus.

6. The computer-readable information recording medium as claimed in claim 5, wherein:
the first system control apparatus comprises a display apparatus, and, in the control method for controlling the first system control apparatus, when the first system control apparatus causes the information processing apparatus control part to start up the first information processing apparatus, the first system control apparatus outputs an error in the display apparatus if the first information processing apparatus is not started up.

7. The computer-readable information recording medium as claimed in claim 5, wherein:
in the control method for controlling the first system control apparatus, the first system control apparatus receives an instruction concerning replacement of the first connecting apparatus, and causes the first connecting apparatus to disconnect the first information processing apparatus from the first shared storage apparatus, and causes the second connecting apparatus to disconnect the first information processing apparatus from the second shared storage apparatus.

8. The computer-readable information recording medium as claimed in claim 5, wherein:
in the control method for controlling the first system control apparatus,
the first system control apparatus causing the first connecting apparatus to disconnect the first information processing apparatus from the first shared storage apparatus comprises the first system control apparatus causing the first connecting apparatus physically disconnect the first information processing apparatus from the first shared storage apparatus,
the first system control apparatus causing the second connecting apparatus to disconnect the first information processing apparatus from the second shared storage apparatus comprises the first system control apparatus causing the second connecting apparatus to physically disconnect the first information processing apparatus from the second shared storage apparatus,
the first system control apparatus causing the other first connecting apparatus to connect the first information processing apparatus with the first shared storage apparatus comprises the first system control apparatus causing the other first connecting apparatus to physically connect the first information processing apparatus with the first shared storage apparatus, the first system control apparatus causing the second connecting apparatus to connect the first information processing apparatus with the second shared storage apparatus comprises the first system control apparatus causing the second connecting apparatus to physically connect the first information processing apparatus with the second shared storage apparatus, and, before the first system control apparatus causes the information processing apparatus control part to start up the first information processing apparatus, the first system control apparatus logically connects the first information processing apparatus with the first shared storage apparatus, and logically connects the first information processing apparatus with the second shared storage apparatus.

9. An information processing apparatus which acts as a first system control apparatus controlled by a control program which, when executed by a computer processor, performs a control method for controlling the first system control apparatus in an information processing system comprising a first information processing apparatus which comprises a first and second connecting apparatuses and the first system control apparatus, and a second information processing apparatus which comprises a third and fourth connecting apparatuses and a second system control apparatus, a first shared storage apparatus connected with the first and second information processing apparatuses through the first and third connecting apparatuses, and a second shared storage apparatus connected with the first and second information processing apparatuses through the second and fourth connecting apparatuses, said control method comprising:

the first system control apparatus causing the first connecting apparatus to disconnect the first information processing apparatus from the first shared storage apparatus;

causing the second connecting apparatus to disconnect the first information processing apparatus from the second shared storage apparatus;

causing an information processing apparatus control part which controls the first information processing apparatus to start up the first information processing apparatus;

causing another first connecting apparatus which is different from the first connecting apparatus and has replaced the first connecting apparatus to connect the first information processing apparatus with the first shared storage apparatus; and causing the second connecting apparatus to connect the first information processing apparatus with the second shared storage apparatus.

10. The information processing apparatus as claimed in claim 9, wherein:

the first system control apparatus comprises a display apparatus, and, in the control method for controlling the first system control apparatus, when the first system control apparatus causes the information processing apparatus control part to start up the first information processing apparatus, the first system control apparatus outputs an error in the display apparatus if the first information processing apparatus is not started up.

11. The information processing apparatus as claimed in claim 9, wherein:

in the control method for controlling the first system control apparatus, the first system control apparatus receives an instruction concerning replacement of the first connecting apparatus, and causes the first connecting apparatus to disconnect the first information processing apparatus from the first shared storage apparatus, and causes the second connecting apparatus to disconnect the first information processing apparatus from the second shared storage apparatus.

12. The information processing apparatus as claimed in claim 9, wherein:

in the control method for controlling the first system control apparatus, the first system control apparatus causing the first connecting apparatus to disconnect the first information processing apparatus from the first shared storage apparatus comprises the first system control apparatus causing the first connecting apparatus physically disconnect the first information processing apparatus from the first shared storage apparatus, the first system control apparatus causing the second connecting apparatus to disconnect the first information processing apparatus from the second shared storage apparatus comprises the first system control apparatus causing the second connecting apparatus to physically disconnect the first information processing apparatus from the second shared storage apparatus, the first system control apparatus causing the other first connecting apparatus to connect the first information processing apparatus with the first shared storage apparatus comprises the first system control apparatus causing the other first connecting apparatus to physically connect the first information processing apparatus with the first shared storage apparatus, the first system control apparatus causing the second connecting apparatus to connect the first information processing apparatus with the second shared storage apparatus comprises the first system control apparatus causing the second connecting apparatus to physically connect the first information processing apparatus with the second shared storage apparatus, and, before the first system control apparatus causes the information processing apparatus control part to start up the first information processing apparatus, the first system control apparatus logically connects the first information processing apparatus with the first shared storage apparatus, and logically connects the first information processing apparatus with the second shared storage apparatus.

* * * * *